Figure 7:
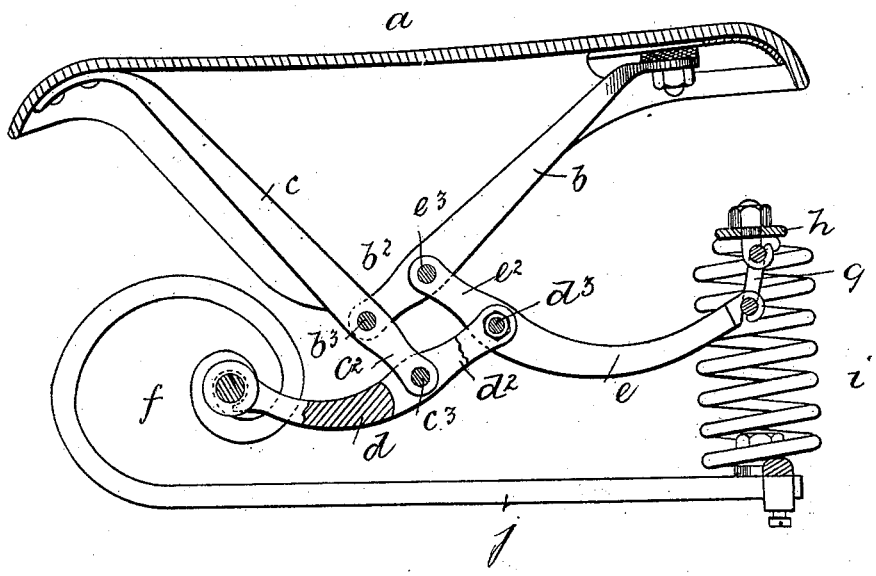

(No Model.) 3 Sheets—Sheet 1.
S. NODDER & W. H. PETFORD.
VELOCIPEDE SADDLE.
No. 423,800. Patented Mar. 18, 1890.
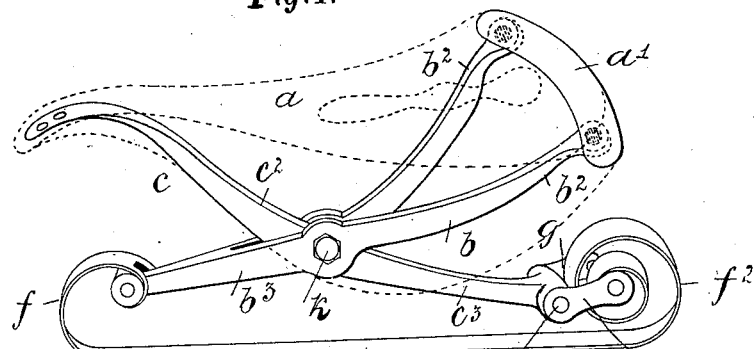
Fig. 1.
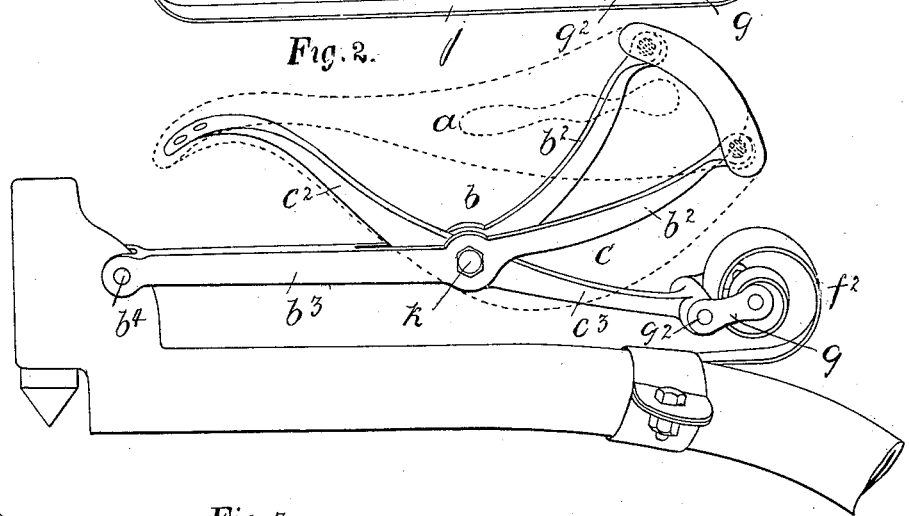
Fig. 2.
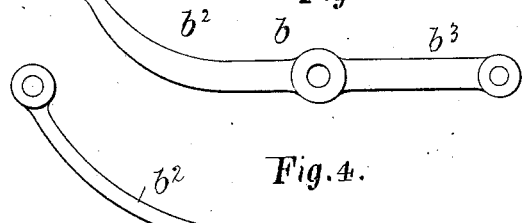
Fig. 3.
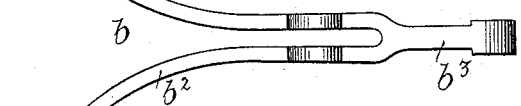
Fig. 4.
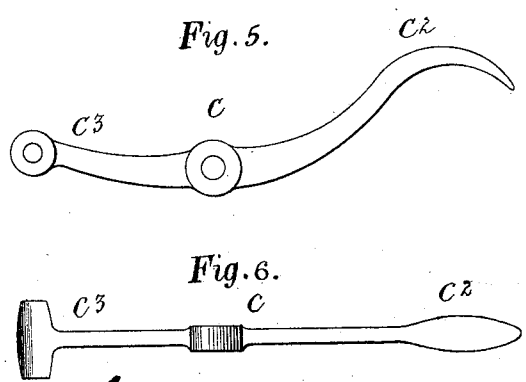
Fig. 5.
Fig. 6.
WITNESSES
Henry L. Kerrett
Robert Evans
Both of Birmingham
INVENTORS
Samuel Nodder
William Henry Petford
Connolly Bros Attys (No Model.) 3 Sheets—Sheet 2.

S. NODDER & W. H. PETFORD.
VELOCIPEDE SADDLE.

No. 423,800. Patented Mar. 18, 1890.

(No Model.) 3 Sheets—Sheet 3.

S. NODDER & W. H. PETFORD.
VELOCIPEDE SADDLE.

No. 423,800. Patented Mar. 18, 1890.

WITNESSES
Henry Skerrett
Robert Evans
Both of Birmingham

INVENTORS
Samuel Nodder
William Henry Petford
Connolly Bros Attys

UNITED STATES PATENT OFFICE.

SAMUEL NODDER AND WILLIAM HENRY PETFORD, OF BIRMINGHAM, ENGLAND, ASSIGNORS TO JOHN HARRISON, OF SAME PLACE.

VELOCIPEDE-SADDLE.

SPECIFICATION forming part of Letters Patent No. 423,800, dated March 18, 1890.

Application filed October 9, 1889. Serial No. 326,432. (No model.) Patented in England August 14, 1888, No. 11,701, and November 7, 1888, No. 16,092.

*To all whom it may concern:*

Be it known that we, SAMUEL NODDER, saddler, of Long Acre, Birmingham, England, and WILLIAM HENRY PETFORD, wheelwright, of Guildford Street, Birmingham, aforesaid, subjects of the Queen of Great Britain, have invented certain new and useful Improvement in Cycle-Saddles, (for which Letters Patent have been applied for and granted in England, dated August 14, 1888, numbered 11,701; November 7, 1888, numbered 16,092;) and we do hereby declare the following to be a full, clear, and exact description of the invention, reference being had to the accompanying drawings, which form part of this specification.

This invention relates to and consists in supporting the saddle-seat upon a system of levers or compound levers arranged fore and aft on the under side of the said seat, and with the outside terminals of the levers or the lower levers connected and carried by rear and front springs supported or taken from the base framing-rods or their equivalents. Thus the under framing of a saddle-seat is so constructed that the outer ends of levers straighten out in obedience to pressure exerted by a rider, and by which means the seat is automatically kept in a constant state of tension.

Figure 1 represents a perspective view of a tricycle-saddle frame constructed and arranged according to one form of our invention. The seat of the saddle is shown in dotted lines.

Fig. 2 is perspective view of the saddle applied to a bicycle. Figs. 3, 4, 5, and 6 represent the levers, which constitute the under framing of the said saddle. $a$ is a distensible or leather saddle-seat, mounted and supported at its rear and front under sides upon levers $b$ $c$, jointed about their middles, and turning upon a pin $k$ as a center. The upper arms of the said lever $b$ are forked, and with the branches $b^2$ terminating in a skirting frame-plate $a'$, which is secured to the rear under side of the saddle-seat $a$. The lower arm, which is marked $b^3$, of the said lever $b$ is jointedly connected at $b^4$ to the end of a bearing-spring $f$, extended from the carrying-plate $j$, whose rear end is evolved into an involute spring $f^2$, to which the lower end $c^3$ of the lever $c$ is connected by shackles $g$, jointed to the arm at $g^2$, while the upper arm $c^2$ of the said lever $c$ has its extreme upper end connected to the front under side of the said saddle-seat. In Fig. 2 (showing this form of my invention applied to a bicycle-saddle) the end of the arm $b^3$ of a lever $b$ is jointedly connected at $b^4$ to the neck of the backbone of a machine, while the spring supporting the lower arm of the other lever is secured to the said backbone by a clip. By supporting saddle-seats upon under framing consisting of jointed and crossing levers pressure put upon the said seat by a rider automatically tensions it.

Figure 8:
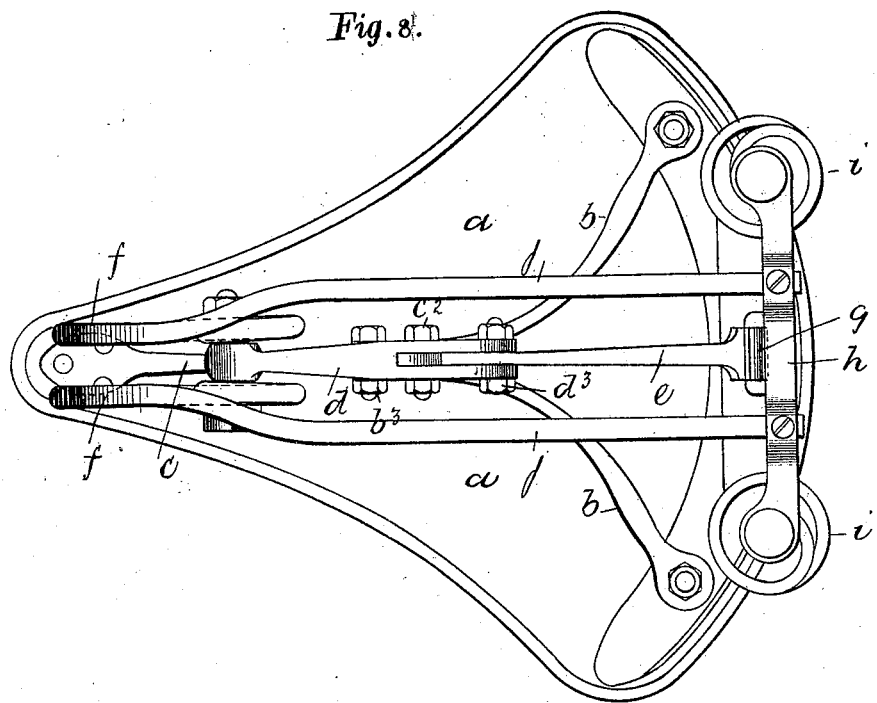
Figure 9:
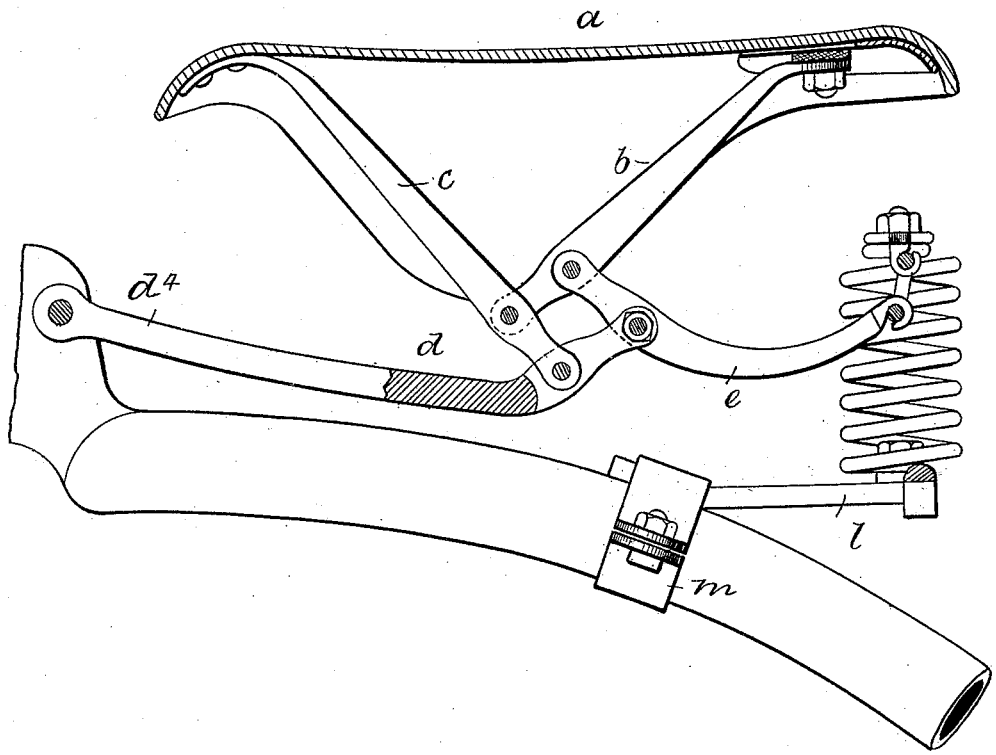

Fig. 7 of the accompanying drawings represents, partly in elevation and partly in vertical section, a tricycle or rear-driving bicycle or "safety" saddle, constructed, arranged, and mounted according to a modification of our invention. It will be seen that the seat of the said saddle is elevated and supported upon the outer and free ends of rear and aft levers, so arranged in respect to secondary levers jointed to them that vertical pressure exerted upon the seat tends to open out the arms of the upper levers and so stretch the said seat from front to rear, as aforesaid. Fig. 8 represents an inverted plan of the same. Fig. 9 represents our invention applied to a bicycle-saddle.

Figure 11:
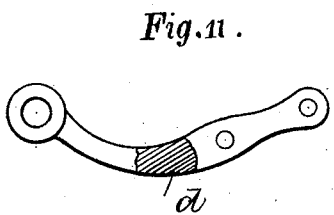
Figure 10:
Figure 10:
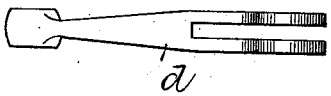
Figure 10:
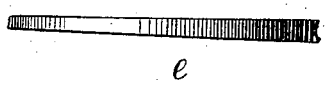

Figs. 10 and 11 are the lower levers of Figs. 7 and 8.

The same letters of reference indicate corresponding parts in the several figures of the drawings.

$a$ is a distensible saddle-seat, mounted and supported on its front and rear under sides by a back primary lever $b$ and a front primary lever $c$. The inner and extreme end $b^2$ of the lever $b$ is jointedly connected at $b^3$ to near the inner end $c^2$ of the lever $c$, while the extreme inner end of the lever $c$ is jointedly connected at $c^3$ to near the inner end $d^2$ of an under and front secondary lever $d$. The inner extreme end of the secondary lever $d$ is jointedly connected at $d^3$ to near the inner end $e^2$ of a rear secondary lever $e$, whose extreme fore part is jointedly connected at $e^3$ to near the said inner end $b^2$ of the primary lever $b$, as aforesaid. Thus the extreme ends of the whole of the levers are jointedly connected to each other, following the order as specified. The outer ends of both rear and front under levers $d$ and $e$, respectively, are connected to springs or spring-connections—viz., the outer end of lever $d$ is supported from the middle of the evolved spring $f$, and the lever $e$ from a link or shackle $g$, connected with a cross-bar $h$, elevated upon the tops of pillar coiled springs $i$, carried by and upon the base $j$, whose fore parts are fashioned into the fore springs. Normally the system of levers, connected as represented with the supporting-springs, lever the seat and automatically keep it in a state of tension, so also does perpendicular pressure exerted upon the top of it by a rider. The rear primary lever is forked or branched to extend the outer connections and bearings of it, and so also is the fore supplementary lever, in order to make a connection with its other and rear lever.

Operation: The weight of the rider, through the seat, exerts a vertical pressure upon the end of the primary levers and through their inner ends to the supplementary and under ones, and by the suspended leverage of them the resultant is that the said primary levers are straightened out and the seat automatically tensioned.

By mounting saddle-seats as described no sagging is admitted, whatever may be the weight of the rider.

In Fig. 9, (bicycle-saddle,) $a$ is the seat. $b$ and $c$ are primary levers. $e$ is a rear secondary lever, while the fore secondary lever $d$ has its outward connection made with the neck of the backbone of a machine by an extension $d^4$. The rear supporting-spring is connected to the said backbone by a base-strut $l$ and clip $m$.

We wish it to be understood that with our system of seat-framing we do not confine ourselves to the means or springs for supporting the lower ends of the levers.

Having thus described our invention, we claim as new and desire to secure by Letters Patent—

1. The combination, with a cycle-saddle seat, of an under framing consisting of levers jointed or crossing each other, and with their upper ends or arms connected to the rear and front under sides of the said saddle-seat, and with their lower ends or arms connected or jointedly connected to springs or other supports, whereby pressure exerted by a rider automatically tensions the said seat, substantially as set forth.

2. The combination, with the seat of a saddle, of crossing-levers with the rear upper arm of one of them forked, to the upper ends of which the rear under side of the saddle-seat is connected, as set forth.

3. The combination, with a cycle-saddle seat, of jointed under framing, a spring-support for the same, and a connecting-link or shackle, substantially as described.

4. The combination, with a cycle-saddle seat, of lever under framing consisting of primary and supplementary levers inwardly jointed to each other, and so arranged that the upper levers open out on pressure being applied to the seat, to which they are connected, substantially as set forth.

In testimony that we claim the foregoing we have hereunto set our hands.

SAMUEL NODDER.
WILLIAM HENRY PETFORD.

Witnesses:
HENRY SKERRETT,
ROBERT EVANS,
    *Both of Birmingham.*